US012497795B1

(12) United States Patent
Zheng

(10) Patent No.: US 12,497,795 B1
(45) Date of Patent: Dec. 16, 2025

(54) SWEEPING METHOD OF SWIMMING POOL CLEANING ROBOT AND CLEANING ROBOT

(71) Applicant: Aiper Global Pte. Ltd., Singapore (SG)

(72) Inventor: Kai Zheng, Jiangsu (CN)

(73) Assignee: Aiper Global Pte. Ltd., Singapore (SG)

(*) Notice: Subject to any disclaimer, the term of this patent is extended or adjusted under 35 U.S.C. 154(b) by 0 days.

(21) Appl. No.: 18/915,494

(22) Filed: Oct. 15, 2024

(30) Foreign Application Priority Data

Aug. 20, 2024 (CN) .................... 202411143763.1

(51) Int. Cl.
| | | |
|---|---|---|
| *E04H 4/16* | (2006.01) | |
| *G05D 1/246* | (2024.01) | |
| *G05D 1/646* | (2024.01) | |
| *G05D 1/648* | (2024.01) | |
| *G05D 105/10* | (2024.01) | |
| *G05D 107/00* | (2024.01) | |
| *G05D 109/30* | (2024.01) | |

(52) U.S. Cl.
CPC .......... *E04H 4/1654* (2013.01); *G05D 1/246* (2024.01); *G05D 1/646* (2024.01); *G05D 1/6486* (2024.01); *G05D 2105/10* (2024.01); *G05D 2107/29* (2024.01); *G05D 2109/38* (2024.01)

(58) Field of Classification Search
CPC .. A47L 2201/04; A47L 2201/06; A47L 22/00; A47L 11/4011; A47L 11/24; G05D 1/6486; G05D 1/646; G05D 1/246; G05D 2105/10; G05D 2107/29; E04H 4/1654
See application file for complete search history.

(56) References Cited

U.S. PATENT DOCUMENTS

| | | | |
|---|---|---|---|
| 8,396,592 B2 * | 3/2013 | Jones ..................... | B25J 9/1694 901/1 |
| 2019/0179325 A1 * | 6/2019 | Deng .................. | A47L 11/4011 |
| 2020/0047343 A1 * | 2/2020 | Bal ........................ | B25J 9/1689 |

* cited by examiner

*Primary Examiner* — Joel D Crandall
(74) *Attorney, Agent, or Firm* — IPro, PLLC

(57) ABSTRACT

The present application discloses a sweeping method of a swimming pool cleaning robot and a cleaning robot, the method including: acquiring map information about an area to be cleaned; planning a first sweeping path based on the map information, the first sweeping path meeting pre-set cleaning parameter requirements; controlling the cleaning robot to travel and perform a cleaning operation based on the first sweeping path; determining whether the cleaning operation is ended, and if so, controlling the cleaning robot to travel to a missed area so as to perform supplementary sweeping. This application can improve sweeping coverage rate and sweeping efficiency.

18 Claims, 2 Drawing Sheets

SWEEPING METHOD OF SWIMMING POOL CLEANING ROBOT AND CLEANING ROBOT

CROSS-REFERENCE TO RELATED APPLICATIONS

This application claims priority to Chinese Patent Application No. 202411143763.1, filed on Aug. 20, 2024, the content of which is incorporated herein by reference in its entirety.

TECHNICAL FIELD

The present application relates to the technical field of cleaning robots, and in particular to a sweeping method of a swimming pool cleaning robot and a cleaning robot.

BACKGROUND

In recent years, with the progress of science and technology and the development of the Internet, robot technology is increasingly mature and widely used in various fields of life. Throughout the market, a wide variety of specialized robots are emerging, with swimming pool cleaning robots providing significant assistance to users addressing a wide range of sweeping efforts. It is used to clean the bottom and side walls of the swimming pool of foreign matter such as sediment dirt and algae to keep the swimming pool clean.

Currently, in order to achieve high coverage traversal algorithms, most swimming pool cleaning robots employ parallel round-trip sweeping paths. Sweeping is performed, for example, by taking two mutually intersecting parallel round-trip paths. Although this method can improve the sweeping coverage rate, there are many repeated sweeping paths and the sweeping time is long.

The statements herein merely provide background information related to the present application and may not necessarily constitute prior art.

SUMMARY

The technical problem to be solved by the present application is to provide a sweeping method of a swimming pool cleaning robot and a cleaning robot, which can improve cleaning coverage rate and cleaning efficiency.

In a first aspect, the present application provides a sweeping method of a swimming pool cleaning robot, including:
  acquiring map information about an area to be cleaned;
  planning a first sweeping path based on the map information, the first sweeping path meeting pre-set cleaning parameter requirements;
  controlling the cleaning robot to travel and perform a cleaning operation based on the first sweeping path;
  determining whether the cleaning operation is ended, and if so, controlling the cleaning robot to travel to a missed area so as to perform supplementary sweeping.

In a second aspect, the present application also provides a cleaning robot, including: one or more processors;
  a storage device for storing one or more programs;
  when the one or more programs are executed by the one or more processors, the one or more processors being caused to implement the method as provided by the first aspect.

The beneficial effects of the present application are: first, performing the initial sweeping according to the first sweeping path. Following the initial sweeping, a supplementary sweeping of any missed areas is performed. Since the areas swept during the initial sweeping do not overlap with the missed areas, this approach significantly reduces redundant sweeping paths, thereby enhancing sweeping efficiency.

DETAILED DESCRIPTION OF THE EMBODIMENTS

The present application will now be described in further detail with reference to the accompanying drawings and examples. It should be understood that the particular embodiments described herein are illustrative only and are not restrictive. It should also be noted that, for ease of description, only some, but not all, of the structures associated with the present application are shown in the figures.

Before discussing exemplary embodiments in more detail, it should be noted that some exemplary embodiments are described as processes or methods depicted as flowcharts. Although a flowchart depicts the steps as a sequential process, many of the steps can be performed in parallel, concurrently, or simultaneously. Further, the order of the steps may be rearranged. The process may be terminated when its operations are complete, but may also have additional steps not included in the figures. A process may correspond to a method, a function, a procedure, a subroutine, a subprogram, etc.

Furthermore, the terms "first", "second", and the like, may be used herein to describe various directions, acts, steps, or elements, and the like, but such directions, acts, steps, or elements are not limited by such terms. These terms are only used to distinguish the first direction, action, step, or element from another direction, action, step, or element. For example, the first information may be second information, and similarly, the second information may be referred to as first information, without departing from the scope of the present application. Both the first information and the second information are information, but they are not the same information. The terms "first", "second", and the like, are not to be construed as indicating or implying relative importance or implicitly indicating the number of technical features indicated. Thus, a feature defined as "first" or "second" may explicitly or implicitly include one or more of the features. In the description herein, "plurality" means at least two, e.g. two, three, etc. unless specifically and specifically limited otherwise.

Figure 1:
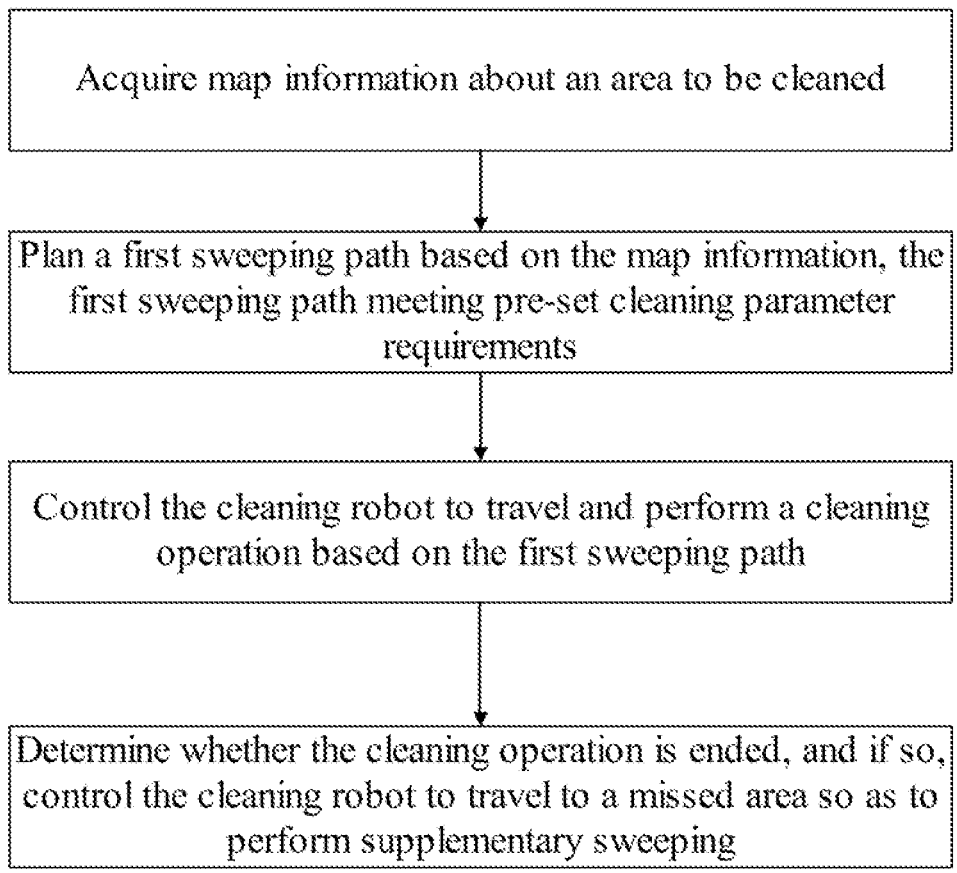
FIG. 1 is a flow diagram of a sweeping method of a swimming pool cleaning robot provided in the present application.

As shown in FIG. 1, the present application provides a sweeping method of a swimming pool cleaning robot, including:
  acquiring map information about an area to be cleaned;
  planning a first sweeping path based on the map information, the first sweeping path meeting pre-set cleaning parameter requirements;

controlling the cleaning robot to travel and perform a cleaning operation based on the first sweeping path;

determining whether the cleaning operation is ended, and if so, controlling the cleaning robot to travel to a missed area so as to perform supplementary sweeping.

It can be seen from the above description that the repeated sweeping path can be greatly reduced and the sweeping efficiency can be improved.

In an alternative embodiment, the cleaning parameter requirements include a cleaning coverage rate requirement or a cleaning efficiency requirement.

As can be seen from the above description, preferably, the sweeping coverage rate or sweeping efficiency can be increased by selecting the path swept with the highest coverage rate or highest efficiency as the first sweeping path. Of course, other cleaning coverage rates or cleaning efficiencies may be selected in view of other factors.

In an alternative embodiment, the missed area includes an area not covered by the first sweeping path, or an area not covered by the actual traveling path.

As can be seen from the above description, an accurate un-swept area can be acquired.

In an alternative embodiment, determining whether the cleaning operation has ended includes at least one of the following determinations:

determining whether the cleaning robot has traversed a pre-set proportion part of the first sweeping path, determining whether the cleaning robot has traveled to a pre-set position point of a swimming pool, and determining whether the cleaning robot encounters an obstacle affecting continued traveling.

As can be seen from the above description, when the cleaning robot has traversed part of the first sweeping path or has encountered a situation in which it is impossible to continue traveling, it can be considered that the sweeping operation of the first sweeping path has ended.

In an alternative embodiment, the missed area is immediately adjacent to the edge of the area to be cleaned;

The step of controlling the cleaning robot to travel to the missed area to perform supplementary sweeping includes controlling the cleaning robot to travel to the missed area along an edge of the area to be cleaned to perform the supplementary sweeping.

It can be seen from the above description that the supplementary scanning is performed by traveling along the edge to the missed area.

In an alternative embodiment, the missed area is adjacent to the edge of the obstacle; The step of controlling the cleaning robot to travel to the missed area to perform supplementary sweeping includes controlling the cleaning robot to travel to the missed area along an edge of the obstacle to perform supplementary sweeping.

It can be seen from the above description that when the cleaning robot encounters an obstacle affecting the continued traveling and ends the sweeping operation, supplementary sweeping can be performed along the edge of the obstacle to the missed area.

In an alternative embodiment, the step of controlling the cleaning robot to travel to the missed area to perform supplementary sweeping includes obtaining a current position of the cleaning robot based on the map information and environmental information acquired by the cleaning robot, planning a route to travel to the missed area based on the current position.

It can be seen from the above description that implementing route planning based on the position of the cleaning robot itself enables the cleaning robot to quickly travel to the missed area, thereby improving the overall cleaning efficiency.

In an alternative embodiment, the planning a first sweeping path based on the map information includes planning a sweeping path of a fixed model based on a plurality of starting points, the plurality of starting points corresponding to orientations of a plurality of different cleaning robots, the fixed model including a U-shaped, S-shaped, spiral-shaped or cross-shaped path.

It can be seen from the above-mentioned description that an optimal or superior first sweeping path can be obtained by planning a plurality of sweeping paths and selecting a sweeping path satisfying parameter requirements therefrom.

In one alternative embodiment, the supplementary sweeping includes controlling the cleaning robot to follow at least a second sweeping path to perform a sweeping operation.

Figure 2:
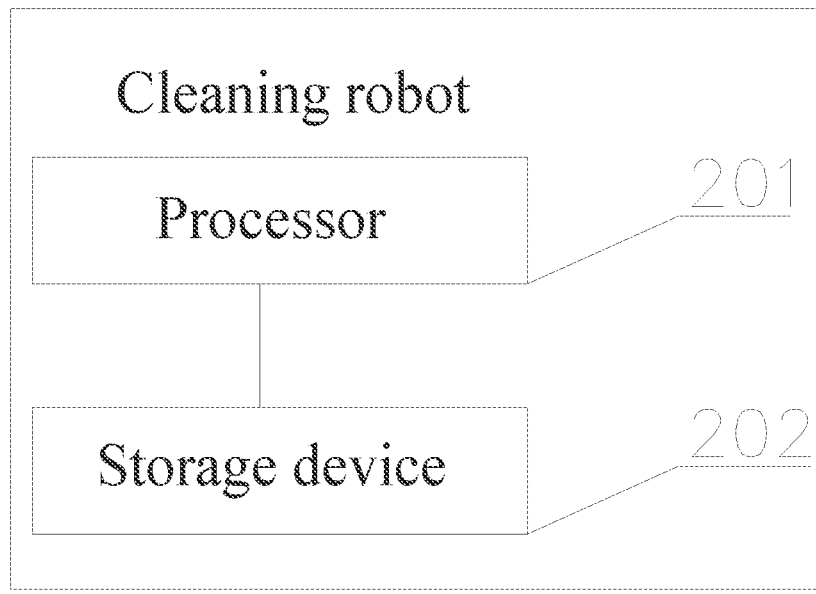
FIG. 2 is a schematic view of the structure of a cleaning robot provided in the present application.

As shown in FIG. 2, the present application also provides a cleaning robot including:

One or more processors 201;

A storage device 202 for storing one or more programs;

When the one or more programs are executed by the one or more processors 201, the one or more processors 201 implement the respective processes in the sweeping method of a swimming pool cleaning robot as described above, and can achieve the same technical effect, and in order to avoid repetition, the description thereof will not be repeated.

Figure 3:
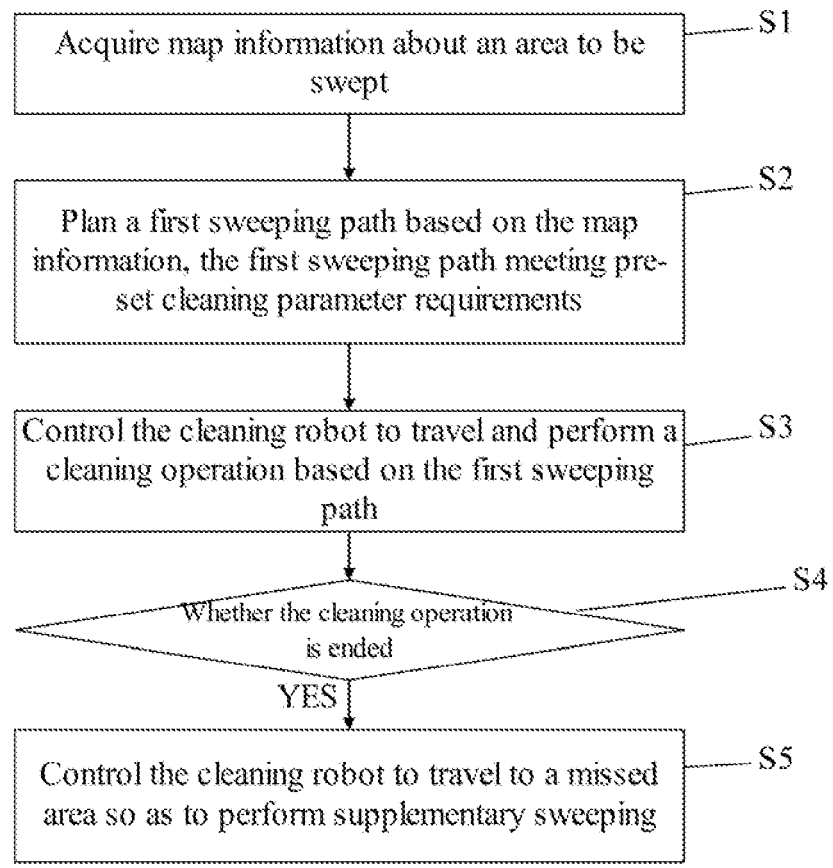
FIG. 3 is a flow chart of a sweeping method of a swimming pool cleaning robot according to an embodiment of the present application.

FIG. 3 shows a sweeping method of a swimming pool cleaning robot including the steps of:

S1: acquiring map information of the area to be swept. If there is a map of an area to be swept, directly acquiring the same; if the map of the area to be swept is not available, the swimming pool cleaning robot first performs edge-building to obtain the map of the area to be swept.

The map information includes map edge information, and may also include islanding information, obstacle information, step information, etc. that is, the position of the factors in the map, such as islanding, obstacles, bosses, etc. which may hinder the robot from traveling.

S2: planning a first sweeping path based on the map information, wherein the first sweeping path meets pre-set cleaning parameter requirements.

Specifically, a plurality of sweeping paths can be first planned based on a plurality of starting points, wherein the plurality of starting points corresponds to a plurality of different robot orientations, and the sweeping paths can be U-shaped, S-shaped, spiral-shaped, or cross paths, parallel round-trip paths, or other path models.

In an alternative embodiment, a plurality of boundary points may be randomly selected on the boundary of the area to be swept as starting points.

In other alternative embodiments, the location point of the cleaning robot in the map may be determined first, for example, in the case of a map, the location point may be a water entry location point; in the absence of a map, the location point may be the location point at the end of the edge mapping. Then, taking the position point as the center, the boundary points of the area to be swept are searched and obtained along the axial direction at preset angles, and the searched and obtained boundary points are taken as the starting point for path planning. For example, if the preset angle is 5°, a search direction is determined every 5° in 360° in the circumferential direction, then a boundary point is searched along the search direction, and finally, 72 boundary points are obtained, and each boundary point plans a path, and 72 sweeping paths are obtained. In other alternative embodiments, if the computational resources are sufficient, a search direction can also be determined every 1°, 360 boundary points can be determined, and finally 360 sweeping paths can be planned.

Wherein, in an alternative embodiment, a straight line is made along the exploring direction, and an intersection point of the straight line with the boundary of the area to be swept is acquired as a boundary point corresponding to the exploring direction.

Figure 4:
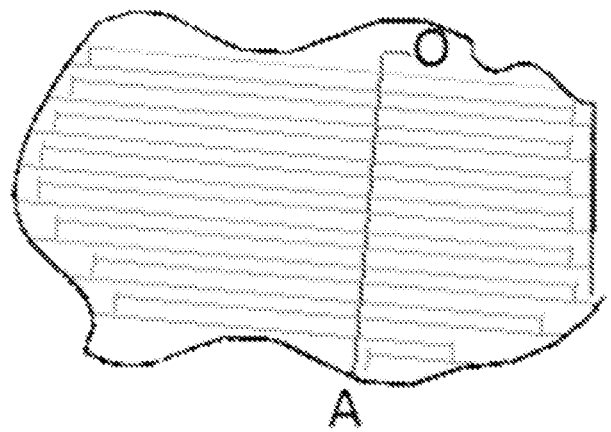
FIG. 4 is a schematic diagram of boundary point exploration and path planning according to an embodiment of the present application.

In another alternative embodiment, a line segment of a pre-set length is firstly made along the exploring direction, and then a vertical straight line is made at the other end point of the line segment, and the intersection point between the straight line and the boundary of the area to be swept is acquired as the boundary point corresponding to the exploring direction. For example, as shown in FIG. 4, FIG. 4 shows a map of a certain swimming pool to be cleaned. Assuming that point O is a water entry position point of a swimming pool cleaning robot, when the direction of exploration is towards the left side of the map, firstly making a line segment of a pre-set length (generally the length of a fuselage) towards the left side, then making a straight line towards the lower side of the map to obtain an intersection point A with a boundary, and taking the point A as a path starting point to plan and obtain a sweeping path.

Then, one of the plurality of sweeping paths is selected as a first sweeping path according to a preset cleaning parameter requirement.

In some alternative embodiments, the cleaning parameter requirement is a maximum cleaning coverage rate, i.e. the first sweeping path covers the largest area of the area of the planned plurality of sweeping paths. The area covered by the sweeping path can be calculated from the route of the sweeping path and the width of the body of the cleaning robot or the width of the sweeping device (such as a roller brush) in the cleaning robot.

In other alternative embodiments, the cleaning parameter requirement is a maximum cleaning efficiency, i.e. the first sweeping path has the shortest cleaning duration among the planned plurality of sweeping paths. When the operating parameters of the cleaning robot (such as cleaning mode, traveling speed, power, etc.) are constant, the cleaning duration is related to the path length, trend, and path model of the sweeping path, and also related to the environment information, including pressure, water flow power, obstacles, water quality, debris and friction, etc.

S3: controlling the cleaning robot to travel and perform a cleaning operation based on the first sweeping path.

S4: determining whether the cleaning operation is ended, and if so, step S5 is executed, and if not, the cleaning operation of the first sweeping path is continued.

In an alternative embodiment, it is determined whether the cleaning operation has ended by determining whether the cleaning robot has traversed a predetermined proportion of the first sweeping path. For example, if the cleaning robot has traversed 80% of the first sweeping path, the cleaning operation of the first sweeping path may be considered to end.

In another alternative embodiment, it is determined whether the cleaning operation is ended by determining whether the cleaning robot has traveled to a preset position point of the swimming pool. The preset position point may be a specific edge point.

In another alternative embodiment, it is determined whether the cleaning operation is ended by determining whether the cleaning robot encounters an obstacle affecting continued traveling. In the practical application scenario, the cleaning robot can monitor its pitch angle and speed through IMU (Inertial Measurement Unit) in real-time during the traveling process, and determine whether it encounters obstacles affecting the continued traveling according to the change of pitch angle and speed. For example, when the pitch angle changes drastically, it is considered that an obstacle is encountered. If the accumulated change of pitch angle exceeds the preset angle, it is considered that the obstacle may affect the traveling. If the cleaning robot continues to travel forcibly, it may cause the cleaning robot to roll over. Or, when the speed becomes zero, the cleaning robot is considered to be stuck and unable to continue traveling.

S5: controlling the cleaning robot to travel to the missed area to perform supplementary sweeping.

In some alternative embodiments, the missed areas include areas not covered by the first sweeping path. In other alternative embodiments, the cleaning robot may sweep in real-time during traveling, or the cleaning robot may end the sweeping operation without traversing the first sweeping path in its entirety, missed areas include areas not covered by the actual traveling path.

In a practical application scenario, the missed area can also be acquired by a masking function in OpenCV. Specifically, in the map of the area to be swept, the pixel value of the pixel point in the cleaned region is set to 0, and the pixel value of the other pixel points is set to 1, so as to obtain a binarized mask image, and then the mask image is multiplied with the map of the area to be swept, so as to obtain a non-cleaned region, namely, a missed area.

The missed area may abut the edge of the area to be cleaned. In some alternative embodiments, the cleaning robot is controlled to travel along the edge of the area to be cleaned to the missed area to perform supplementary sweeping. Further, in one embodiment, based on the map information and the environmental information collected by the cleaning robot, the current position of the cleaning robot is acquired, and the route to the missed area is planned based on the current position, i.e. the cleaning robot first determines its position in the area to be cleaned and then travels to the missed area along the edge.

The missed area may also abut the edge of the obstacle. When the cleaning robot ends the sweeping work by encountering an obstacle affecting continued traveling, it may travel along the edge of the obstacle to the missed area to perform supplementary sweeping.

In an alternative embodiment, supplementary sweeping includes controlling the cleaning robot to follow at least a second sweeping path to perform a sweeping operation. The second sweeping path may be U-shaped, S-shaped, spiral-shaped, cross-path, parallel round-trip path, or other path models.

Further, when traveling according to the second sweeping path to perform the sweeping operation, it can be determined whether the sweeping operation of the second sweeping path is ended or not with reference to the above-mentioned steps S4-S5, and if so, the cleaning robot is controlled to travel to the missed area to perform the supplementary sweeping, and the missed area at this time includes the path which is not covered by the first sweeping path and the second sweeping path, or the area which is not covered by the actually traveling path. By analogy, the missed area is iteratively supplementary swept until the area to be swept is completely swept, or the proportion of the swept area to the total area of the area to be swept exceeds a certain proportion (e.g. 80%).

In summary, the present application provides a sweeping method of a swimming pool cleaning robot and a cleaning robot, wherein a path with the highest coverage rate or the highest efficiency is selected as a path for cleaning for the first time, and after cleaning for the first time, a supplementary sweeping is performed on a leaking sweeping area until all the areas to be cleaned are swept or the sweeping coverage rate is satisfied, so that a repeated sweeping path can be greatly reduced, and efficient cleaning can be achieved while satisfying the coverage rate and can be applied to swimming pools of different shapes with strong versatility.

From the above description of embodiments, it will be clear to a person skilled in the art that the present application can be implemented by means of software and the necessary general-purpose hardware, but of course also by means of hardware, the former being in many cases a better embodiment. Based on such an understanding, the technical solution of the present application, either per se or in any way making a contribution to the prior art, can be embodied in the form of a software product, and the computer software product can be stored in a computer-readable storage medium, such as a floppy disk of a computer, a Read-Only Memory (ROM), a Random Access Memory (RAM), a FLASH, a hard disk or an optical disk, etc. and includes a plurality of instructions for causing a computer device (which can be a personal computer, a server, or a network device, etc.) to execute a method according to various embodiments of the present application.

It should be noted that in the embodiments of the above-mentioned device, the various units and modules included are merely divided according to functional logic, but are not limited to the above-mentioned division, as long as corresponding functions can be realized; in addition, the specific names of each functional unit are merely for facilitating mutual distinction, and are not intended to limit the scope of protection of the present application.

The above-mentioned embodiments are merely examples of the present application and are not intended to limit the scope of the present application, and all changes that come within the meaning and range of equivalency of the present application and the appended claims are to be embraced within their scope.

The invention claimed is:

1. A sweeping method of a swimming pool cleaning robot, comprising:
   acquiring map information about an area of a swimming pool to be cleaned;
   planning a first sweeping path based on the map information from a plurality of sweeping paths, wherein the first sweeping path covers a largest of the area to be cleaned among the plurality of sweeping paths or has a shortest cleaning duration among the plurality of cleaning paths;
   controlling the swimming pool cleaning robot to travel and perform a cleaning operation based on the first sweeping path firstly; and
   determining whether the cleaning operation is ended, and if so, controlling the swimming pool cleaning robot to travel to a missed area so as to perform supplementary sweeping.

2. The sweeping method of the swimming pool cleaning robot of claim 1, wherein the missed area comprises an area not covered by the first sweeping path.

3. The sweeping method of the swimming pool cleaning robot of claim 2, wherein determining whether the cleaning operation is ended comprises at least one of the following determinations:
   determining whether the swimming pool cleaning robot has traversed a pre-set part of the first sweeping path, determining whether the swimming pool cleaning robot has traveled to a pre-set position point of a swimming pool, and determining whether the swimming pool cleaning robot encounters an obstacle.

4. The sweeping method of the swimming pool cleaning robot of claim 3, wherein the missed area is immediately adjacent to an edge of the area to be cleaned; and
   a step of controlling the swimming pool cleaning robot to travel to the missed area to perform supplementary sweeping comprises controlling the swimming pool cleaning robot to travel to the missed area along an edge of the area to be cleaned to perform the supplementary sweeping.

5. The sweeping method of the swimming pool cleaning robot of claim 3, wherein the missed area is immediately adjacent to an edge of the obstacle; and
   a step of controlling the swimming pool cleaning robot to travel to the missed area to perform supplementary sweeping comprises controlling the swimming pool cleaning robot to travel to the missed area along an edge of the obstacle to perform supplementary sweeping.

6. The sweeping method of the swimming pool cleaning robot of claim 4, wherein the step of controlling the swimming pool cleaning robot to travel to a missed area to perform supplementary sweeping comprises acquiring a current position of the swimming pool cleaning robot based on environmental information and the map information collected by the swimming pool cleaning robot and planning a route to travel to the missed area based on the current position, wherein the environment information comprises one or more of pressure, water flow power, obstacles, water quality, debris and friction.

7. The sweeping method of the swimming pool cleaning robot of claim 5, wherein the step of controlling the swimming pool cleaning robot to travel to a missed area to perform supplementary sweeping comprises acquiring a current position of the swimming pool cleaning robot based on the environmental information and the map information collected by the swimming pool cleaning robot and planning a route to travel to the missed area based on the current position.

8. The sweeping method of the swimming pool cleaning robot of claim 1, wherein the supplementary sweeping comprises controlling the swimming pool cleaning robot to travel along at least a second sweeping path to perform a sweeping operation.

9. The sweeping method of the swimming pool cleaning robot of claim 2, wherein the supplementary sweeping comprises controlling the swimming pool cleaning robot to travel along at least a second sweeping path to perform a sweeping operation.

10. A swimming pool cleaning robot, comprising:
    one or more processors;
    a storage device for storing one or more programs;
    the one or more processors being caused to implement a sweeping method comprising:
    acquiring map information about an area of a swimming pool to be cleaned;
    planning a first sweeping path based on the map information from a plurality of sweeping paths, wherein the first sweeping path covers a largest of the area to be cleaned among the plurality of sweeping paths or has a shortest cleaning duration among the plurality of cleaning paths;

controlling the swimming pool cleaning robot to travel and perform a cleaning operation based on the first sweeping path firstly; and determining whether the cleaning operation is ended, and if so, controlling the swimming pool cleaning robot to travel to a missed area so as to perform supplementary sweeping.

11. The swimming pool cleaning robot of claim 10, wherein the missed area comprises an area not covered by the first sweeping path.

12. The swimming pool cleaning robot of claim 11, wherein determining whether the cleaning operation is ended comprises at least one of the following determinations:

determining whether the swimming pool cleaning robot has traversed a pre-set part of the first sweeping path, determining whether the swimming pool cleaning robot has traveled to a pre-set position point of a swimming pool, and determining whether the swimming pool cleaning robot encounters an obstacle.

13. The swimming pool cleaning robot of claim 12, wherein the missed area is immediately adjacent to an edge of the area to be cleaned; and a step of controlling the swimming pool cleaning robot to travel to the missed area to perform supplementary sweeping comprises controlling the swimming pool cleaning robot to travel to the missed area along an edge of the area to be cleaned to perform the supplementary sweeping.

14. The swimming pool cleaning robot of claim 12, wherein the missed area is immediately adjacent to an edge of the obstacle; and a step of controlling the swimming pool cleaning robot to travel to the missed area to perform supplementary sweeping comprises controlling the swimming pool cleaning robot to travel to the missed area along an edge of the obstacle to perform supplementary sweeping.

15. The swimming pool cleaning robot of claim 13, wherein the step of controlling the swimming pool cleaning robot to travel to a missed area to perform supplementary sweeping comprises acquiring a current position of the swimming pool cleaning robot based on environmental information and the map information collected by the swimming pool cleaning robot and planning a route to travel to the missed area based on the current position, wherein the environment information comprises one or more of pressure, water flow power, obstacles, water quality, debris and friction.

16. The swimming pool cleaning robot of claim 15, wherein the step of controlling the swimming pool cleaning robot to travel to a missed area to perform supplementary sweeping comprises acquiring a current position of the swimming pool cleaning robot based on the environmental information and the map information collected by the swimming pool cleaning robot and planning a route to travel to the missed area based on the current position.

17. The swimming pool cleaning robot of claim 10, wherein the supplementary sweeping comprises controlling the swimming pool cleaning robot to travel along at least a second sweeping path to perform a sweeping operation.

18. The swimming pool cleaning robot of claim 11, wherein the supplementary sweeping comprises controlling the swimming pool cleaning robot to travel along at least a second sweeping path to perform a sweeping operation.

* * * * *